(12) United States Patent
Hopf (10) Patent No.: US 7,516,766 B2
(45) Date of Patent: Apr. 14, 2009

(54) INTRA-WHEEL REAR SUSPENSION SYSTEM

(75) Inventor: Werner G. Hopf, San Marcos, CA (US)

(73) Assignee: Dew Mfg., Inc., Oceanside, CA (US)

( * ) Notice: Subject to any disclaimer, the term of this patent is extended or adjusted under 35 U.S.C. 154(b) by 87 days.

(21) Appl. No.: 11/424,529

(22) Filed: Jun. 15, 2006

(65) Prior Publication Data

US 2007/0289796 A1    Dec. 20, 2007

(51) Int. Cl.
*B60B 9/08*    (2006.01)
*B62K 11/00*   (2006.01)

(52) U.S. Cl. .......................... 152/87; 180/227; 280/286

(58) Field of Classification Search ................ 180/227; 280/285–286; 152/17, 21, 25, 87–88, 97–98
See application file for complete search history.

(56) References Cited

U.S. PATENT DOCUMENTS

| | | | | |
|---|---|---|---|---|
| 585,286 | A | * | 6/1897 | Prescott ...................... 280/286 |
| 614,726 | A | * | 11/1898 | Kierakowicz et al. ........ 280/286 |
| 656,905 | A | * | 8/1900 | Schmitz ...................... 280/286 |
| 663,047 | A | * | 12/1900 | Schmitz ...................... 280/286 |
| 711,077 | A | * | 10/1902 | Schmitz ...................... 280/286 |
| 1,197,526 | A | | 9/1916 | Mesecke ..................... 180/219 |
| 1,470,118 | A | * | 10/1923 | Schaefer ...................... 152/87 |
| 1,778,463 | A | * | 10/1930 | Novak ......................... 152/87 |
| 2,164,413 | A | | 7/1939 | Kuehn ......................... 180/227 |
| 4,552,373 | A | | 11/1985 | Kawaguchi et al. ......... 180/219 |
| 5,390,757 | A | | 2/1995 | Smith ......................... 180/227 |

FOREIGN PATENT DOCUMENTS

| | | | |
|---|---|---|---|
| DE | 3222262 | 12/1983 | ................. 280/275 |
| EP | 0469475 | 2/1992 | ................. 180/219 |

* cited by examiner

*Primary Examiner*—Jason R Bellinger
(74) *Attorney, Agent, or Firm*—Myers Andras Sherman LLP; Joseph C. Andras (57) ABSTRACT

Disclosed is an intra-wheel rear suspension system moveably supporting a rotating wheel relative to a frame via a concentric hub structure, the system exhibiting minimal side play or torsional play due to its unique bearing structure. The system includes an inner carrier assembly having an inner slide block with front curved bearing surface and a rear curved bearing surface. A non-rotating axle extends to either side of the inner slide block and is secured to the frame. An outer track frame that is adapted for rotatably supporting the wheel via any suitable concentric hub structure, has a curved aperture with front and rear curved bearing surfaces that engage the front and rear curved bearing surfaces of the inner slide block. The outer track frame moves arcuately up and down relative to the inner slide block in response to a shock absorbing displacement. In order to minimize lateral side play or torsional movement, the outer track frame has left and right side bearing surfaces, and the inner carrier assembly has a pair of side plates fixedly secured to its left and rights sides, each side plate having a front and rear flat bearing surface that slidably engage the left and right side flat bearing surfaces of the outer track frame.

9 Claims, 9 Drawing Sheets

INTRA-WHEEL REAR SUSPENSION SYSTEM

BACKGROUND OF THE INVENTION

1. Field of the Invention

The present invention pertains generally to wheel suspension systems and, more particularly, to an intra-hub rear suspension system for a motorcycle.

2. Description of the Prior Art

Many motorcycles have rigid frames. Such motorcycles could benefit from an intra-hub rear suspension system. Other motorcycles have used rear shock absorbing systems, or suspensions, comprised of external shock absorbers or springs that are mounted outboard of the rear axle to provide for dampened, load-induced movement of the rear wheel relative to the rear frame. For example, some motorcycle rear frames include a shock absorbing swing-arm coupled to a pivot axle. However, these outboard suspension systems exhibit some mechanical inefficiency and clutter the appearance of the motorcycle.

Additionally, many suspension systems do not guide the rear wheel along an arc that is centered on the drive sprocket connected to the drive chain or drive belt. Such suspension systems undesirably allow for relative movement of the rear wheel with respect to the rear frame and thereby alter the tension of the drive chain during operation of the motorcycle. The result is high wear and inefficiency of the drive chain system.

Figure 1:
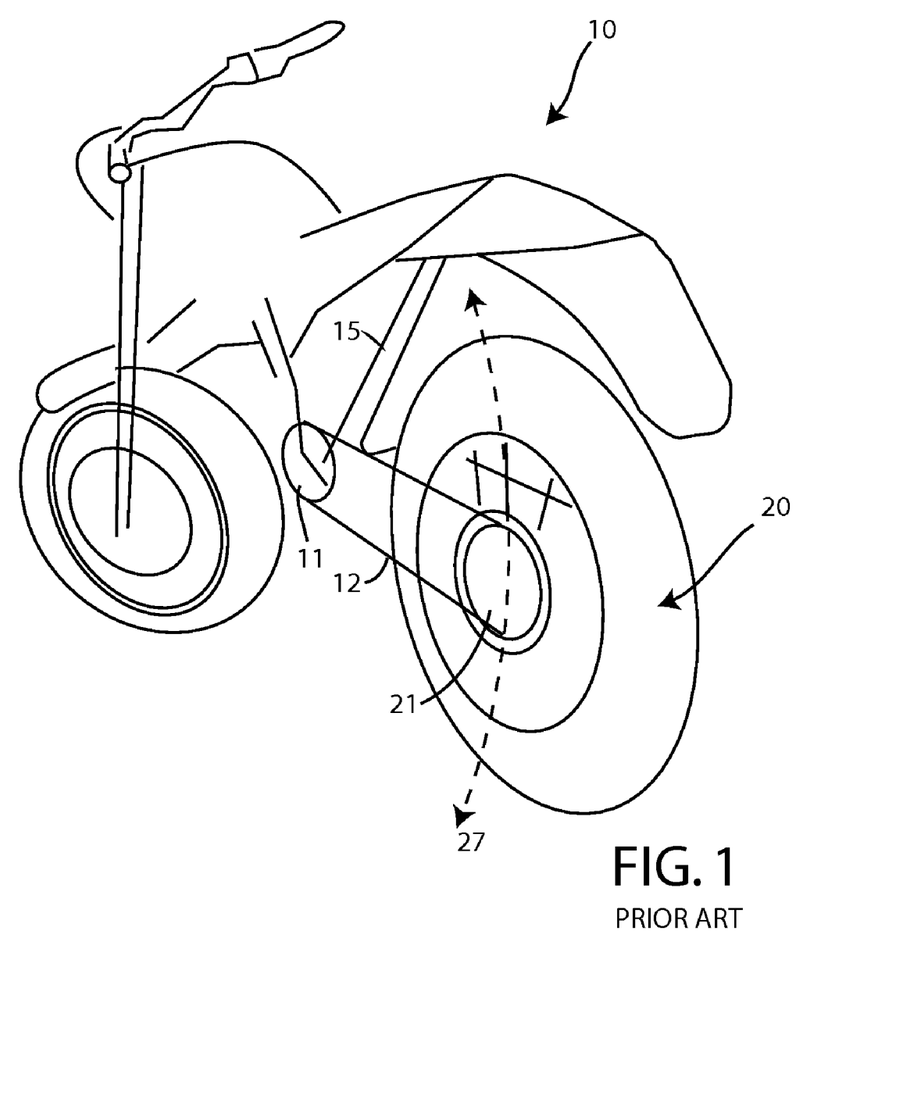
FIG. 1 shows a motorcycle having a rear wheel with an intra-hub suspension system according to a preferred embodiment of the invention such that it moves along an arc centered about the drive sprocket.

FIG. 1 shows a motorcycle 10 including a frame 15 and a rear wheel 20 that may include an intra-hub rear suspension according to this invention. As shown, the motorcycle further includes a drive sprocket 11 that is coupled to a wheel sprocket 21 via a suitable drive belt or drive chain 12. Ideally, the motorcycle 10 will include a suspension system that permits the rear wheel 20 to move along an arc 27 that is centered about the drive sprocket 11.

A prior art intra-hub wheel suspension is disclosed in U.S. Pat. No. 5,390,757, entitled "Intra-Wheel Rear Suspension System for Motorcycles," assigned to Dew Manufacturing Company, Inc., the assignee of the present invention. The Smith patent is hereby incorporated by reference in its entirety as if fully set forth herein.

Figure 2:
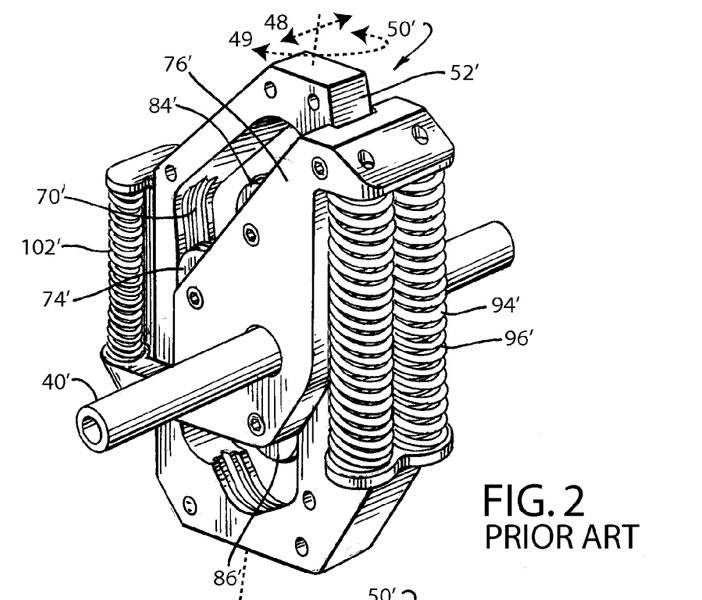
FIG. 2 is a perspective view of a prior art intra-wheel rear suspension system.
Figure 3:
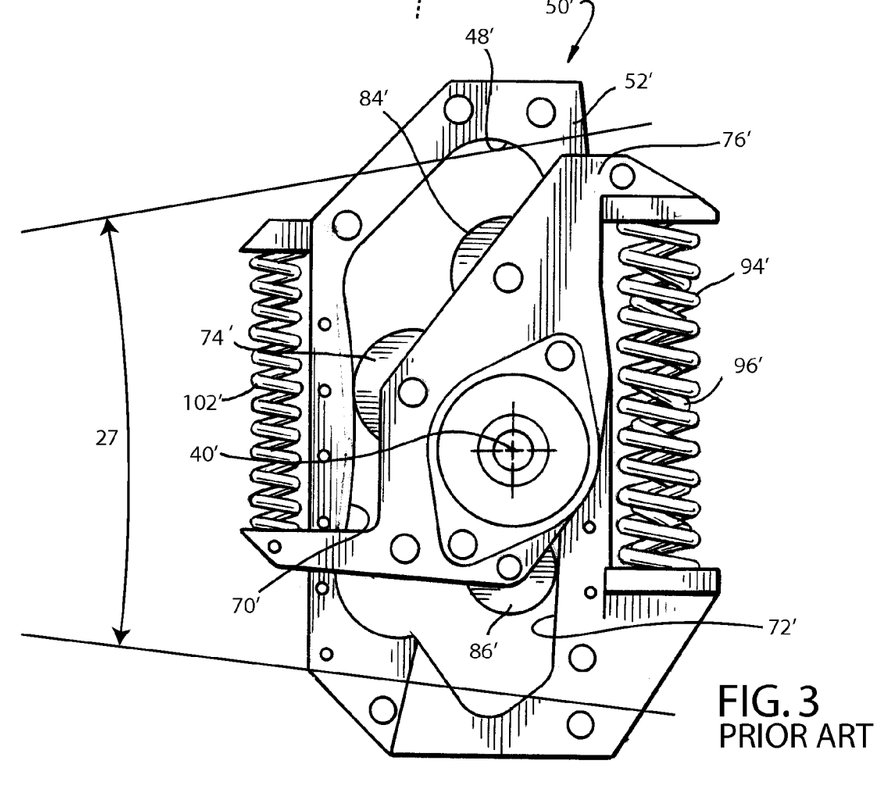
FIG. 3 is a side elevational view of the prior art intra-wheel rear suspension system of FIG. 2.

FIGS. 2 and 3 are representative of the intra-wheel rear suspension system disclosed in the Smith patent. The item numbers used generally correspond to those used within the Smith patent, with the addition of a prime, e.g. 50' corresponds to item 50. As shown, the Smith patent discloses an intra-wheel rear suspension system includes a shock absorber mechanism 50' that is part of an inner hub (not shown here) that rotatably supports an outer hub (also not shown here) connected to a rim and tire.

The shock absorber mechanism 50' comprises two main parts, an inner carrier assembly 76' with a rear shaft 40' extending to either side thereof, and an outer track frame 52' that moves relative to the inner carrier assembly 76'. Two pairs of nested load springs 94'/96' are captured between the inner carrier assembly 76' and the outer track frame 52'. The load springs 94'/96' serve as shock absorbers, i.e. they are compressed when the road surface pushes the rear wheel upward relative to the motorcycle frame or when inertia pushes the motorcycle frame downward relative to the rear wheel. Another pair of smaller rebound springs 102' are captured on the opposite side of the assembly. The smaller rebound springs 102' function as return and dampening springs.

The rear shaft 40', the inner carrier assembly 76', and certain other components (not shown for clarity), are fixedly attached to the lateral arms of the motorcycle's rear frame. The outer track frame 52', along with certain other components that are rotatably supported by the outer track frame 52' (such as an outer hub, a rim, and a tire) can move up and down relative to the inner carrier assembly 76'.

The Smith patent's shock absorber mechanism 50' beneficially provided for arcuate movement 27 as illustrated by FIG. 1 (in exaggeration) and FIG. 3. In particular, the inner carrier assembly 76' included a plurality of rollers 74', 84', 86' and the outer track frame 52' included a pair of grooved cam surfaces 70', 72' that are curved or arcuate. The grooved cam surfaces 70', 72' engaged the rollers 74', 84', 86' such that the outer track frame 52' moved in an arc 27 relative to the inner carrier assembly 76'. This arcuate movement was a significant advancement in that it maintained a constant tension on the drive belt (not shown). However, the prior art shock absorber mechanism 50' disclosed in the Smith patent also exhibited certain deficiencies owing to its design and construction. In particular, because of the lateral play between the grooved cam surfaces 70', 72' and the rollers 74', 84', 86', the Smith patent's shock absorber mechanism 50' also permitted some degree of lateral and/or torsional movement, or play, about its vertical axis as suggested in exaggeration by arrows 48 and 49 of FIG. 2. Such movement, of course, is undesirable. In operational tests, the angular movement was observed to be 0.015 inches or more.

Consequently, there remains a need for an intra-wheel rear suspension system that addresses the problem of angular movement or torsional play.

Therefore, it is an object of the present invention (1) to provide an improved suspension system that is entirely contained within the hub of a wheel of a vehicle; (2) to provide an improved suspension system for the rear wheel of a motorcycle; (3) to provide an improved suspension for the rear wheel of a motorcycle that will increase chain life and decrease wear and maintenance requirements; (4) to provide a suspension system for the rear wheel of a motorcycle that provides relative movement of the wheel in an arc about the drive sprocket of the motorcycle; (5) to provide a motorcycle suspension having extended wear characteristics; (6) to provide a motorcycle suspension having an uncluttered appearance; and (7) to provide a design and method for an intra-wheel rear suspension system that addresses the problem of angular movement or torsional play.

BRIEF SUMMARY OF THE INVENTION

The present invention specifically addresses and alleviates the above mentioned deficiencies associated with the prior art. In one aspect, the invention is an intra-wheel rear suspension system moveably supporting a rotating wheel relative to a frame via a concentric hub structure, comprising an inner carrier assembly including an inner slide block and non-rotating axles extending to either side of the inner slide block, the non-rotating axles fixedly secured to the frame, the inner slide block having front and rear curved bearing surfaces, an outer track frame adapted for rotatably supporting the wheel via the concentric hub structure, the outer track frame having a curved aperture with front and rear curved bearing surfaces that engage the front and rear curved bearing surfaces of the inner slide block, the outer track frame moving arcuately up and down relative to the inner slide block in response to a shock absorbing displacement, the outer track frame further comprising left and right side bearing surfaces, and a pair of side plates fixedly secured to left and rights sides of the inner carrier assembly, each side plate having a front and rear flat bearing surface that slidably engage the left and right side flat bearing surfaces of the outer track frame to minimize lateral and torsional play of the outer track frame, and wheel supported thereby, relative to the inner carrier assembly.

The just summarized invention can be better visualized by turning now to the following drawings wherein like elements are referenced by like numerals.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DETAILED DESCRIPTION OF THE PREFERRED EMBODIMENTS

A intra-hub suspension system constructed in accordance with the principles of the present invention is intended to reduce the lateral 48 and/or angular movement 49 that was undesirably permitted by the prior art system 50' of FIGS. 2 and 3.

Figures 4, 5:
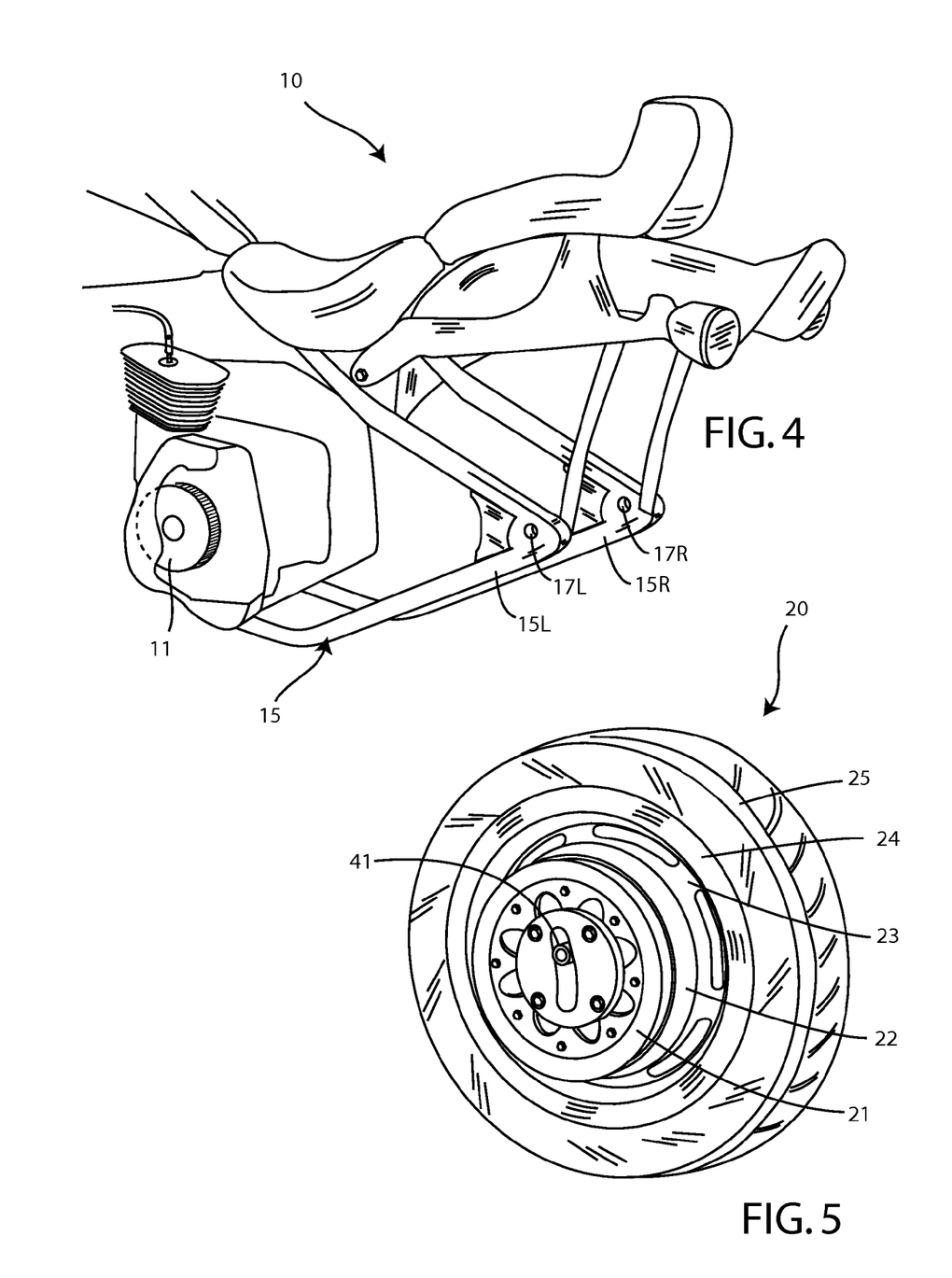
FIG. 4 is a more detailed perspective view of a rear portion of the motorcycle 10 of FIG. 1, showing the lateral arms 15L, 15R to which a rear wheel containing an intra-wheel rear suspension system according to a preferred embodiment of the invention may be mounted.
FIG. 5 is a perspective view of a rear wheel having an intra-hub suspension system according to a preferred embodiment of the invention.

FIG. 4 is a more detailed perspective view of a rear portion of the motorcycle 10 of FIG. 1, but without a rear wheel, thereby revealing much of its frame 15 and the lateral arms 15L, 15R that support the rear wheel via a pair of mounting apertures 17L, 17R. Also shown is a drive sprocket 11. The motorcycle's power train (engine and transmission) is operationally connected to the drive sprocket 11 for transferring rotational motion to the rear wheel.

FIG. 5 shows the left side of a rear wheel 20 that contains an intra-hub suspension system 30 (see FIGS. 7-10) according to a preferred embodiment of the present invention. As shown, the rear wheel 20 includes a rear shaft 41, a concentric wheel hub 22 that rotates around the rear shaft 41, a rim 24 connected to the hub 22, and a tire 25 connected to the rim 24. The rim 24 may be integral with the wheel hub 22, or it may be connected thereto by any suitable arrangement such as with a solid disk, a plurality of radial members, wire spokes, etc. The illustrated wheel 20 includes a plurality of radial members 23. The intra-hub suspension system 30 of FIGS. 7-10 is located within the wheel hub 22, and thus not visible in this drawing, but its rear shaft 41 is visible at the center of the wheel 20.

Figure 6:
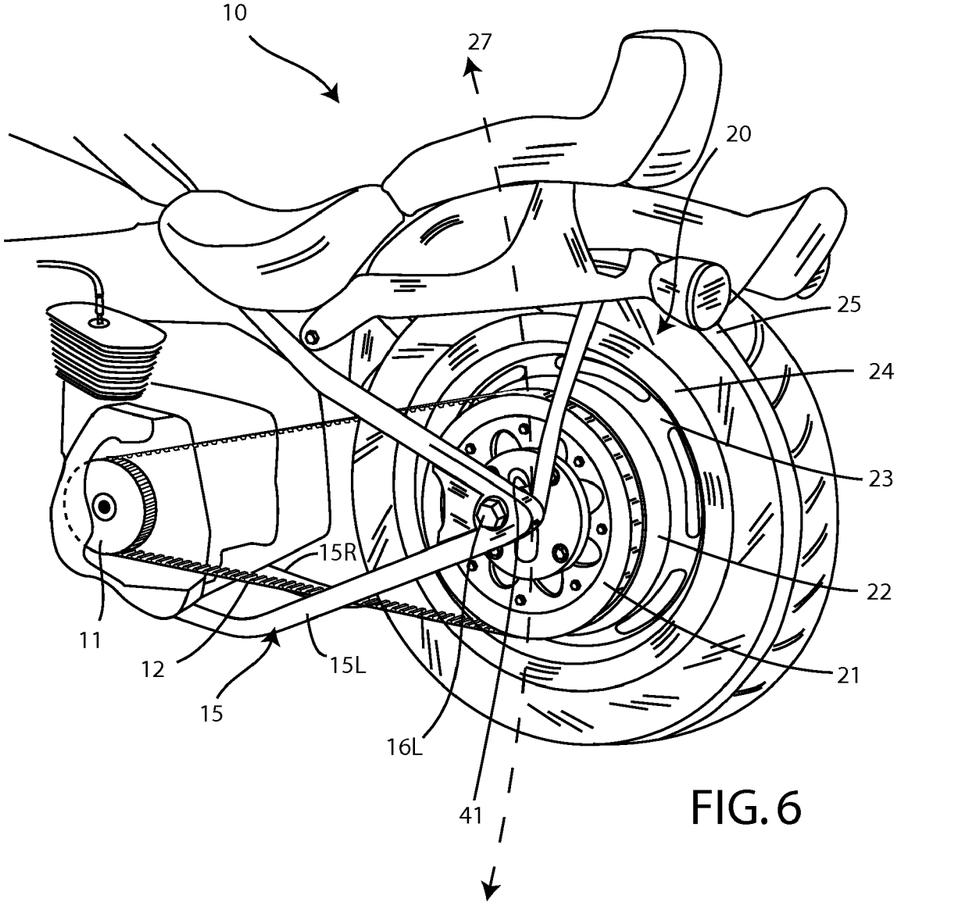
FIG. 6 is a perspective view of the rear wheel of FIG. 5 mounted to the motorcycle frame of FIG. 4.
Figure 7:
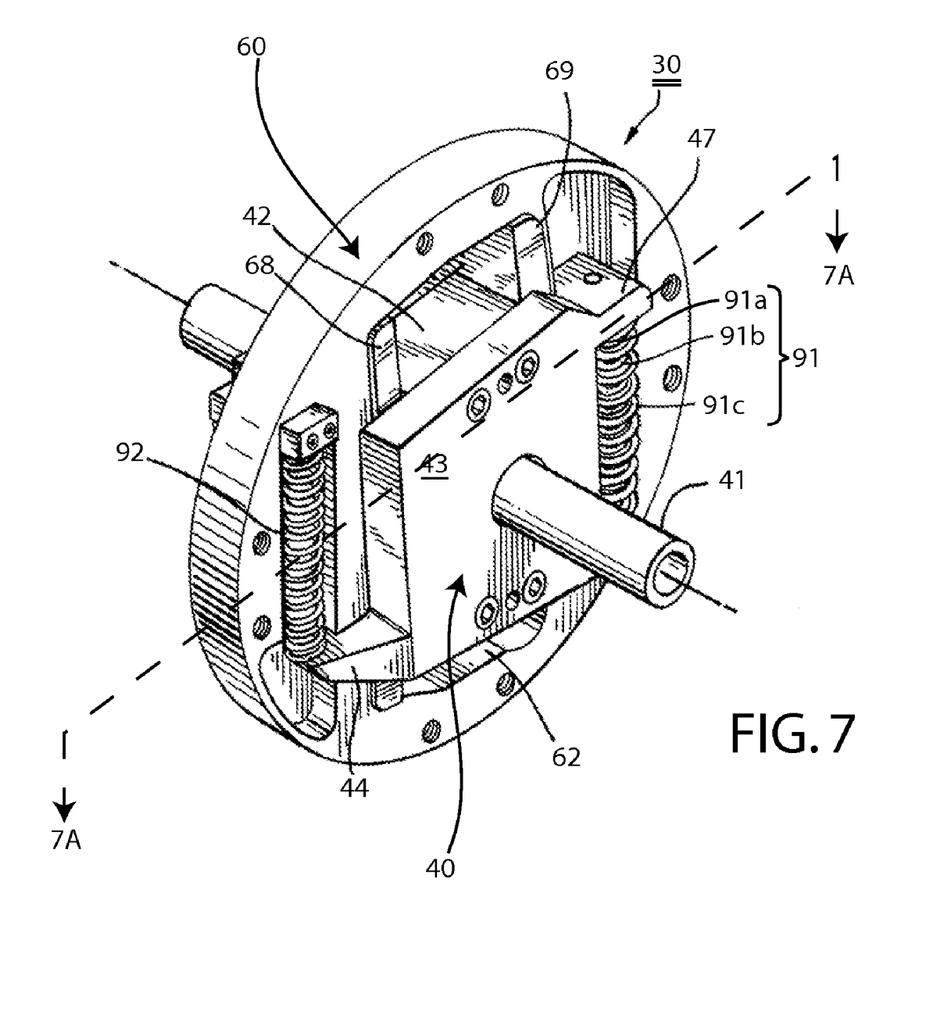
FIG. 7 is a perspective view of a preferred embodiment of an intra-wheel rear suspension system according to the present invention.
Figure 7A:
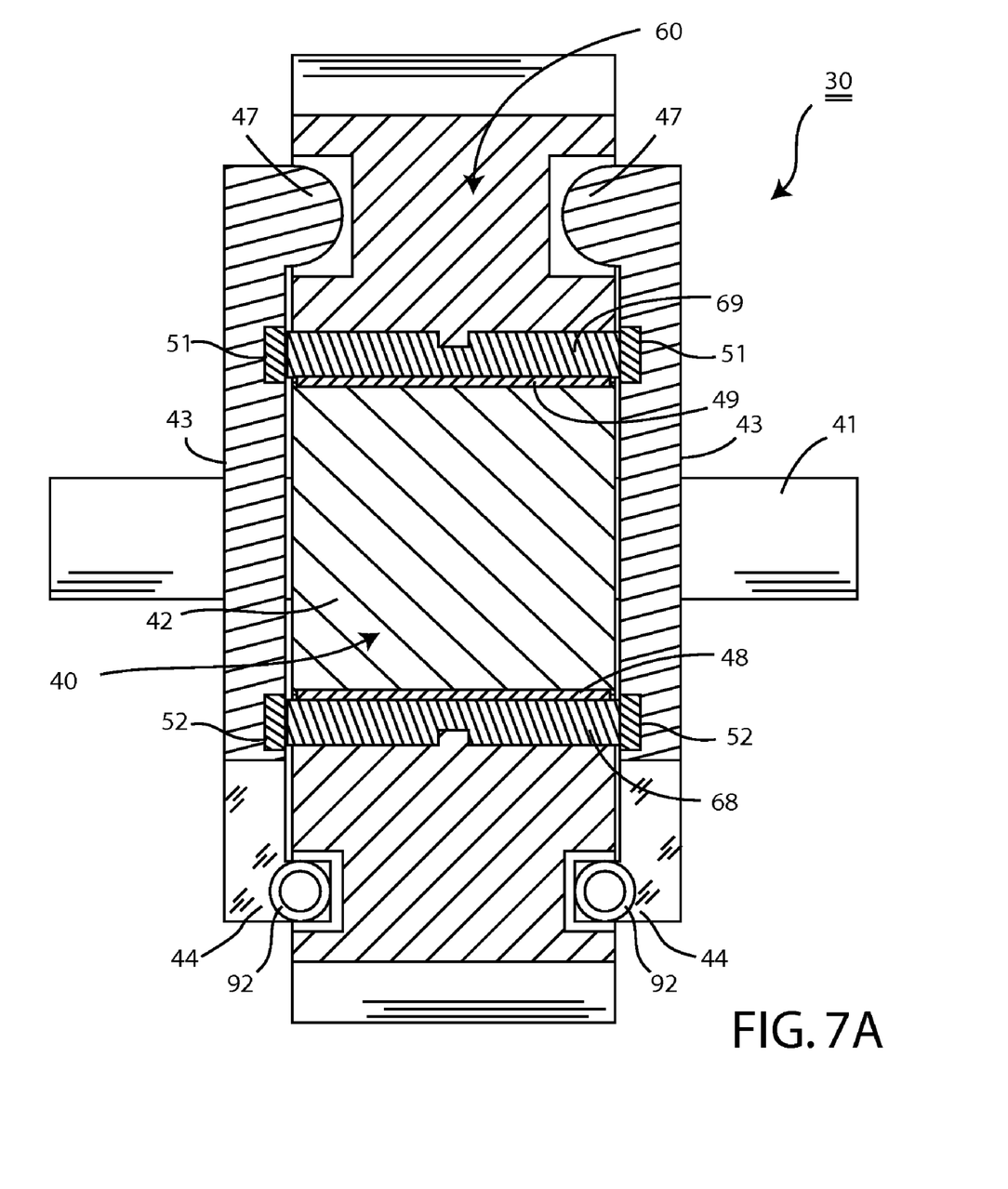
FIG. 7A is a cross-sectional view of the intra-wheel rear suspension system of FIG. 7, taken along section lines 7A-7A.
Figure 8:
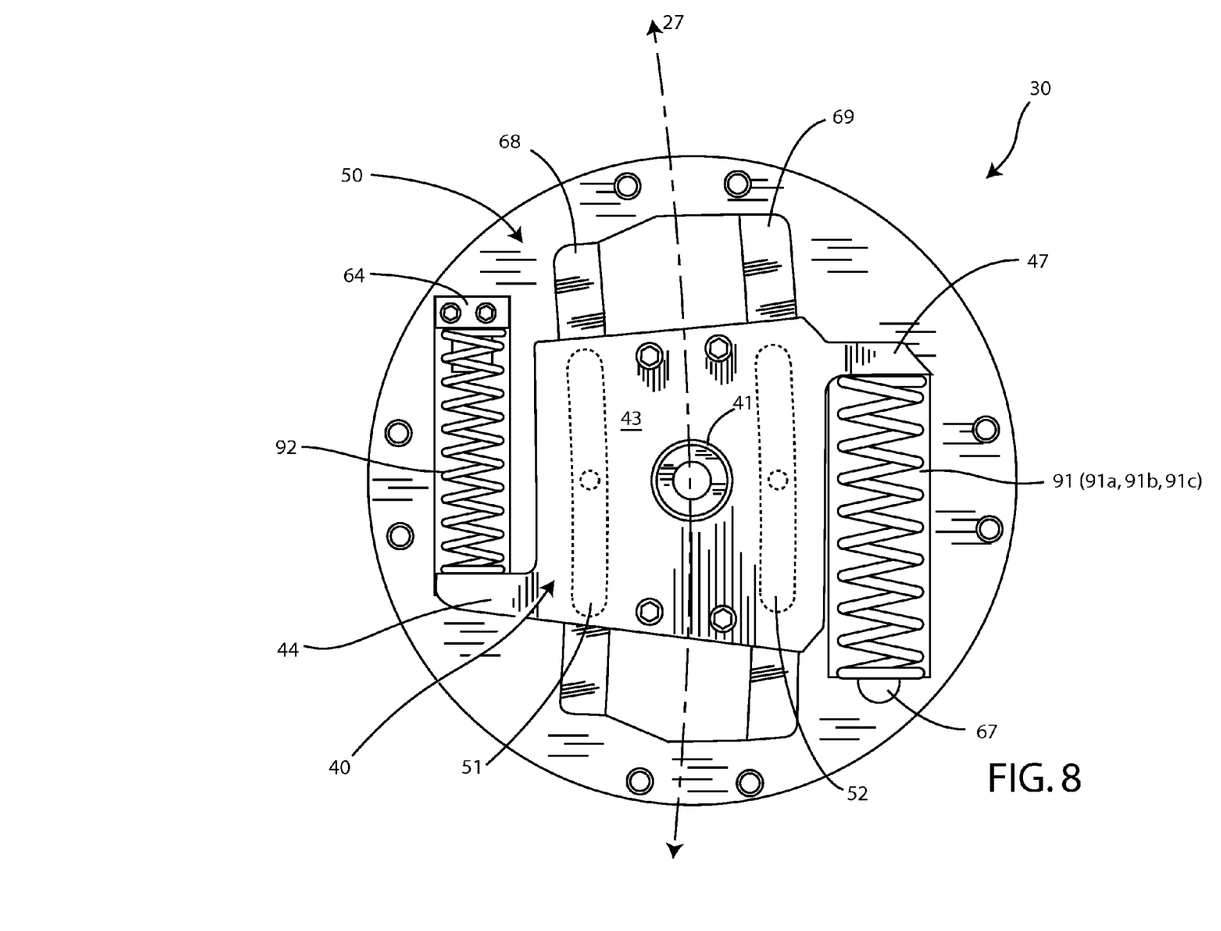
FIG. 8 is a side elevational view of the preferred embodiment of an intra wheel suspension system according to the present invention.
Figure 9:
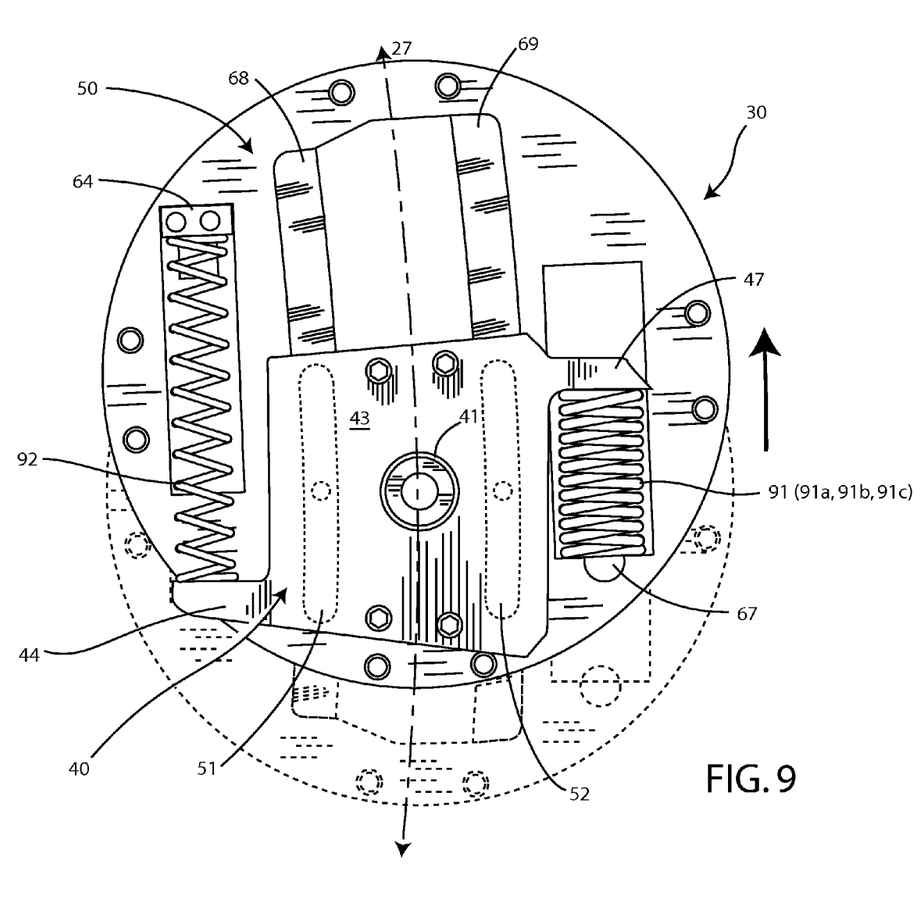
FIG. 9 is another side elevation view of the preferred intra-wheel rear suspension system of FIG. 8, showing the position of the outer track frame and compression of the rear load springs when the outer track frame is moved arcuately upward under load.

FIG. 6 shows the wheel 20 of FIG. 5 mounted to the lateral arms 15L, 15R of the motorcycle frame 15 of FIG. 4. The illustrated mounting uses a pair of axle nuts 16L, 16R that extend through mounting apertures 17L, 17R in the lateral arms 15L, 15R and then engage suitable threads on the inside of the wheel's rear shaft 41 (see FIG. 5), but numerous other arrangements are possible. In this embodiment, a drive belt 12 connects the drive sprocket 11 to the wheel sprocket 21. Although it is not visible in FIG. 6, this embodiment further includes a brake disk that is located on an opposite side of the wheel 20.

As the motorcycle 10 carries its rider over the road, varying loads and shocks are applied to and removed from the wheel 20 owing to the weight of frame and rider, acceleration forces, and uneven road surfaces. By virtue of the intra-hub suspension system 30 (described further below with references to FIGS. 7-10), the wheel 20 moves relative to the frame 15 about an arc 27 that is centered on the drive sprocket 11.

FIGS. 7, 8, 9 and 10 illustrate the structural details of an intra-hub suspension system 30 according to a preferred embodiment of the present invention. The illustrated suspension system 30 is housed within the concentric wheel hub 22 (see FIG. 5) such that the wheel hub 22, rim 23, and tire 24 rotate around the suspension system 30 and, when necessary, move vertically about an arc 27 (see FIGS. 1, 6, 8 and 9). The construction details of the concentric wheel hub 22 are omitted because any suitable arrangement may be used, because such details are not critical to a full understanding of the suspension system 30 of the present invention, because they are well known to those of ordinary skill in the art, and because a detailed example is already presented in the Smith patent.

The intra-hub suspension system 30, best understood by working from the center out, includes an inner carrier assembly 40 and an outer track frame 60 that slides up and down on suitable bearings relative to the inner carrier assembly 40 As described more fully below, a unique arrangement of bearing liners and bearings allows for arcuate up and down movement of the outer track frame 60, while beneficially limiting lateral and/or torsional play.

Figure 10:
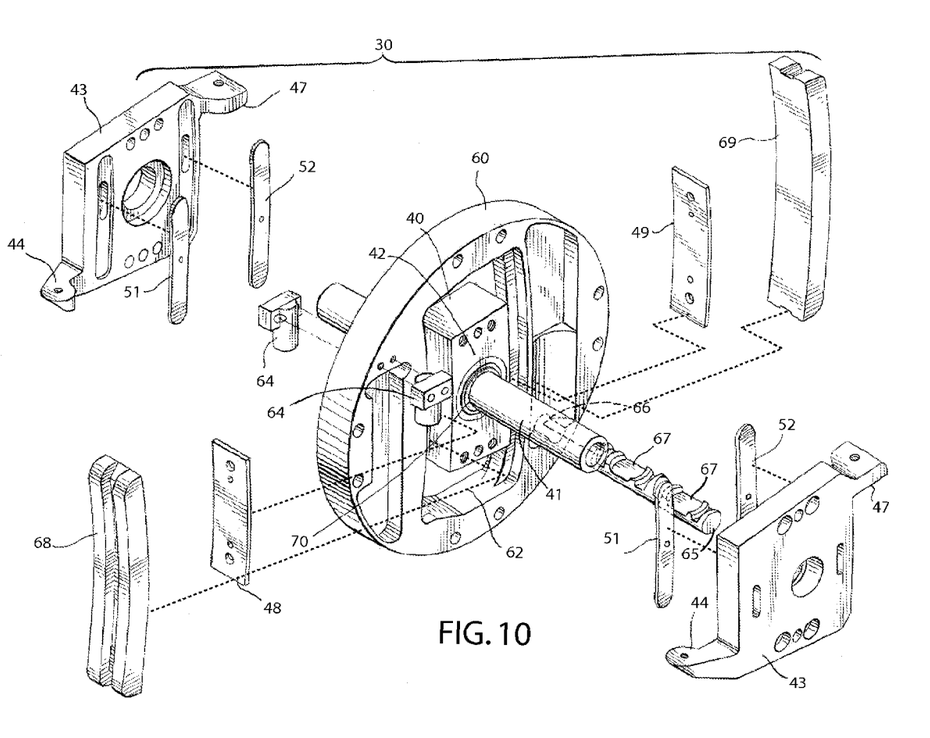
FIG. 10 is an exploded perspective illustration of the preferred embodiment of an intra-wheel rear suspension system according to the present invention, with the compression springs omitted for clarity.

The inner carrier assembly 40 includes the rear axle 41 which extends to either side thereof for fixed, non-rotational attachment to the frame 15 (see FIGS. 4-6). The inner carrier assembly 40 further comprises an inner slide block 42, a pair of side plates 43, 43, a curved front bearing 48, a curved rear bearing 49, a left pair of flat bearings 51, 52, and a right pair of flat bearings 51, 52. As best shown in FIG. 10, the curved front bearing 48 is connected to a curved front side of the inner slide block 42 and the curved rear bearing 49 is connected to a rear side of the inner slide block 42. And, as also best shown in FIG. 10, each pair of flat bearings 51, 52 is connected to a corresponding pair of recesses (not separately numbered) on an inner side of each side plate 43. Lastly, each side plate 43 includes a front spring perch 44 and a rear spring perch 47. Because the perches 44, 47 provide the side plate 43 with an overall Z-shape, each side plate 43 is sometimes called a "Z-perch".

The outer track frame 60 is provided as a generally circular plate with a curved aperture 62 that surrounds and permits the overall track frame 60 to move arcuately up and down relative to the inner carrier assembly's inner slide block 42 in response to shock absorbing displacement. A pair of small spring supports 64, 64 are located at a front side of the outer track frame 60, and a pair of large spring supports 67, 67 are located at a rear side of the outer track frame. In the preferred embodiment, the large spring supports 67, 67 are defined by a member 65 that extends through a transverse hole 66 in the outer track frame 60. As shown in FIGS. 7-10, a front bearing liner 68 and a rear bearing liner 69 are located within the curved aperture 62. The preferred bearing liners 68, 69 are made of steel. They form an integral part of the unique bearing structure.

Each bearing liner 68, 69 includes a curved face that provides an arcuate bearing surface and a pair of side faces that provide flat bearing surfaces. The curved bearing surfaces are curved to match the intra-hub suspension system's arcuate movement 27 about the center of the motorcycle's drive sprocket 11 (see FIG. 6).

The preferred intra-hub suspension system 30 further comprises a compression spring system including a pair of load spring assemblies 91, 91 and a pair of front return springs 92, 92. Each load spring assembly is formed from a concentric or nested plurality of compression springs 91a, 91b, 91c (see right side FIG. 10) to provide sufficient spring force for absorbing shock without bottoming out.

FIG. 10 is an exploded view of the preferred intra-hub suspension system 30, with the springs omitted for clarity. By studying this illustration, one can see the operational arrangement between the front and rear bearings 48, 49 and the curved surfaces of the bearing liners 68, 69 and the operational arrangement between the flat side bearings 51, 52 and the flat side surfaces of the same bearing liners 68, 69. Viewing FIG. 10 in conjunction with FIGS. 7-9, one sees that the front and rear bearing liners 68, 69 fit securely inside of the outer track frame's aperture 62 (with grooves that engage a raised ridge) and thereby surround and slidingly engage the front and rear bearings 48, 49 of the inner slide block 42. Furthermore, as best shown by viewing FIG. 10 alone, one sees that the side plates 43 and their flat side bearings 51, 52 surround and slidingly engage the flat side surfaces of the bearing liners 68, 69. As a result of this unique arrangement, the front and back of the inner slide block 42 is captured by the outer track frame 60, and the outer track frame is captured left and right by the inner slide block's side plates 43, 43. In other words, the front and rear bearing liners 68, 69 are engaged on three sides by bearings 51, 48, 51 and 52, 49, 52, respectively, in order to allow relative movement upward or downward while preventing any undesired lateral and/or torsional movement.

As already noted, the front and rear bearing liners 68, 69 are preferably made of steel. The curved front and rear bearings 48, 49 and the flat side bearings 51, 51, 52, 52 are preferably made of TEFLON® woven friction reducing material.

As to the springs, the front compression springs are captured between an upper spring support 64 associated with the outer track frame 60 and a lower spring perch 44 associated with the side plate 43 of the inner carrier assembly 40. The rear compression springs 91, 91b, 92c, conversely, are captured between a spring perch 67 associated with the outer track frame 60 and an upper spring perch 47 associated with the side plate 43 of the inner carrier assembly 40.

Many alterations and modifications may be made by those having ordinary skill in the art without departing from the spirit and scope of the invention. Therefore, it must be understood that the illustrated embodiments have been set forth only for the purposes of example and that it should not be taken as limiting the invention as defined by the following claims. For example, notwithstanding the fact that the elements of a claim are set forth below in a certain combination, it must be expressly understood that the invention includes other combinations of fewer, more or different elements, which are disclosed in above even when not initially claimed in such combinations.

It should be understood that the intra-wheel rear suspension system described above is merely a preferred embodiments of the invention and this embodiment should not service to limit the claimed invention, the full scope of which is set forth in the appended claims.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

What is claimed is:

1. An intra-wheel rear suspension system moveably supporting a rotating wheel relative to a frame and a concentric hub structure, comprising:
    an inner carrier assembly including an inner slide block and non-rotating axles extending to either side of the inner slide block, the non-rotating axles fixedly secured to the frame, the inner slide block having front and rear curved bearing surfaces;
    an outer track frame adapted for rotatably supporting the wheel with the concentric hub structure, the outer track frame having a curved aperture with front and rear curved bearing surfaces that engage the front and rear curved bearing surfaces of the inner slide block, the outer track frame moving arcuately up and down relative to the inner slide block in response to a shock absorbing displacement, the outer track frame further comprising left and right side flat bearing surfaces, and
    a pair of side plates fixedly secured to left and rights sides of the inner carrier assembly, each side plate having front and rear flat bearing surfaces that slidably engage the left and right side flat bearing surfaces of the outer track frame to minimize lateral and torsional play of the outer track frame, and the wheel supported thereby, relative to the inner carrier assembly.

2. The intra-wheel rear suspension system of claim 1 wherein:
    the outer track frame further comprises front and rear curved bearing liners located within the curved aperture, adjacent flat side surfaces of the front and rear curved bearing liners serving as the left and right side flat bearing surfaces of the outer track frame.

3. The intra-wheel rear suspension system of claim 2 wherein each of the side plates further comprise front and rear flat bearings that are removeably connected to an interior side of the slide plate to slidably engage the flat side surfaces of the front and rear curved bearing liners of the outer track frame.

4. The intra-wheel rear suspension system of claim 2 wherein the front and rear curved bearing liners of the outer track frame are made of a friction reducing material.

5. The intra-wheel rear suspension system of claim 2 wherein the front and rear curved bearing surfaces of the inner carrier assembly comprise front and rear curved bearings that are removeably secured to front and rear sides of the inner slide block, the front and rear curved bearing liners of the outer track frame slidably engaging the front and rear curved bearing surfaces of the inner carrier assembly's front and rear curved bearings.

6. The intra-wheel rear suspension system of claim 5 wherein the front and rear curved bearings that form the front and rear curved bearing faces of the inner carrier assembly are made of steel.

7. The intra-wheel rear suspension system of claim 1 further comprising:
- a pair of rear lower spring supports on each side of the outer track frame;
- a pair of rear upper spring supports on each side plate; and
- a pair of rear compression springs, each rear compression spring located between a corresponding rear lower spring support of the outer track frame and a rear upper spring support of a side plate, the rear compression springs providing resistance against an upward movement of the outer track frame relative to the inner carrier assembly in response to a shock absorbing displacement.

8. The intra-wheel rear suspension system of claim 7 wherein each rear compression spring comprises a plurality of concentric springs.

9. The intra-wheel rear suspension system of claim 7 further comprising:
- a pair of front lower spring supports on each side plate;
- a pair of front upper spring supports on each side of the outer track frame; and
- a pair of front compression springs, each front compression spring located between a corresponding front lower spring support of a side plate and a front upper spring support of the outer track frame, the front compression springs providing a return bias against a downward movement of the outer track frame relative to the inner carrier assembly.

* * * * *